(12) United States Patent
Trainin

(10) Patent No.: US 7,768,971 B2
(45) Date of Patent: Aug. 3, 2010

(54) CENTRAL FREQUENCY MODIFICATION WITHOUT COMMUNICATION DISRUPTION

(75) Inventor: Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 653 days.

(21) Appl. No.: 11/693,482

(22) Filed: Mar. 29, 2007

(65) Prior Publication Data
US 2008/0240023 A1 Oct. 2, 2008

(51) Int. Cl.
H04W 72/00 (2009.01)
(52) U.S. Cl. .................... 370/329; 455/452.2
(58) Field of Classification Search ............... 370/311, 370/338–345.1, 395.41, 85.7, 319, 329, 431; 726/3; 455/522, 69, 452.1
See application file for complete search history.

(56) References Cited

U.S. PATENT DOCUMENTS

2002/0094833 A1* 7/2002 Lieshout et al. ............. 455/522
2007/0133448 A1* 6/2007 Gao et al. .................. 370/311
2007/0192832 A1* 8/2007 Qi et al. ........................ 726/3

* cited by examiner

*Primary Examiner*—George Eng
*Assistant Examiner*—Nizar Sivji
(74) *Attorney, Agent, or Firm*—Carrie A. Boone, P.C.

(57) ABSTRACT

Methods for modifying a central frequency of a channel following a change in channel width between wireless devices are disclosed. The station desiring a channel width change notifies the AP and enters a constructive power management mode, which keeps the AP from sending frames to the station. This enables the station to move the central frequency without concern of data loss, then restores itself to a full-power state. Or, the station communicates the desire to switch channel modes after receiving a beacon frame from the AP, then switches the central frequency of the channel during a subsequent beacon, or during some predetermined time period prior to the subsequent beacon. While the central frequency is being changed, the station does not miss a frame intended to be communicated to the station.

6 Claims, 6 Drawing Sheets

CENTRAL FREQUENCY MODIFICATION WITHOUT COMMUNICATION DISRUPTION

TECHNICAL FIELD

This application relates to wireless transmission under the 802.11n standard and, more particularly, to selecting between a channel width of 20 MHz and 40 MHz.

BACKGROUND

The Institute of Electrical and Electronics Engineers (IEEE) has adopted a set of standards for wireless local area networks (LANs), known as 802.11. Wireless products satisfying 802.11a, 802.11b, and 802.11g are currently on the market, for example.

Recently, an 802.11n standard, known also as the Enhancement for High Throughput wireless standard, has emerged. Under the 802.11n standard, transmitters and receivers each have multiple antennas for transmission and reception of data. As a multiple input, multiple output (MIMO) technology, 802.11n is designed to coordinate multiple simultaneous radio signals, and is expected to support a bandwidth of greater than 100 megabits per second (Mbps).

In addition to supporting multiple antennas, the 802.11n standard defines a new channel width of 40 MHz, for higher transmission rates, where the previous wireless standards supported a 20 mega-Hertz (MHz) channel width. The 40 MHz channel occupies two neighboring 20 MHz channels, denoted as either primary or secondary. The channels are located either in a 2.4 Giga-Hertz (GHz) band or in 5.2 GHz band.

Under 802.11, a device (or client) accesses a wireless LAN (WLAN) by following a communication protocol, essentially involving the transmission of frames to an access point (AP). The frames may be data frames, control frames, or management frames. The frames convey information that enables the AP to "connect" the device to the WLAN.

Under 802.11n, devices supporting a 20 MHz channel width may coexist with devices supporting a 40 MHz channel width. The 802.11n specification allows a first 40 MHz-capable station to notify a second 40 MHz-capable station (or AP) to deliver all frames directed to the first station using a 20 MHz channel width. In some circumstances, the first station may also switch its own transmissions to a 20 MHz channel width.

A station operating in the 40 MHz mask mode may transmit and receive frames sent in the 20 MHz channel width. In this mode, the station cannot use pure 20 MHz filtering to support the 20 MHz mask, since the central frequency is still set for the 40 MHz mask. A station that transmits the 20 MHz channel width frame and does not use the 20 MHz mask is likely to produce much noise in the adjacent channel, as compared to a transmission using the 20 MHz mask. A station that receives frames sent in the 20 MHz channel, while this station operates in the 40 MHz mask, makes the receiving station more sensitive to noise in the adjacent channel, as compared to stations receiving in the 20 MHz mask.

Thus, in order for a 40 MHz-capable station to operate in a 20 MHz mode, the station needs to change the central frequency. The station needs to switch their central frequency when moving from 40 MHz mask to 20 MHz mask, and vice-versa. Such a switch may be needed, for example, where interference from another station causes noise to exist on the secondary channel.

The 802.11n specification defines AP administered switching between 40 MHz and 20 MHz channel width transmissions of the entire Basic Service Set that reserves time for the central frequency switching, known as phased coexistence operation (PCO). PCO is an optional feature, however, and thus does not solve the central frequency problem. Further, PCO does not allow any separate station switching between a 40 MHz mask and a 20 MHz mask on its own.

The 802.11n specification does not give the station that wants to change its mask enough time to switch the central frequency. If the station changes its central frequency when a frame intended for the station is transmitted, the station may lose the frame.

Thus, there is a need for a mechanism for a wireless LAN station to change the central frequency without losing a frame of data being transmitted to the station.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

Figure 1:
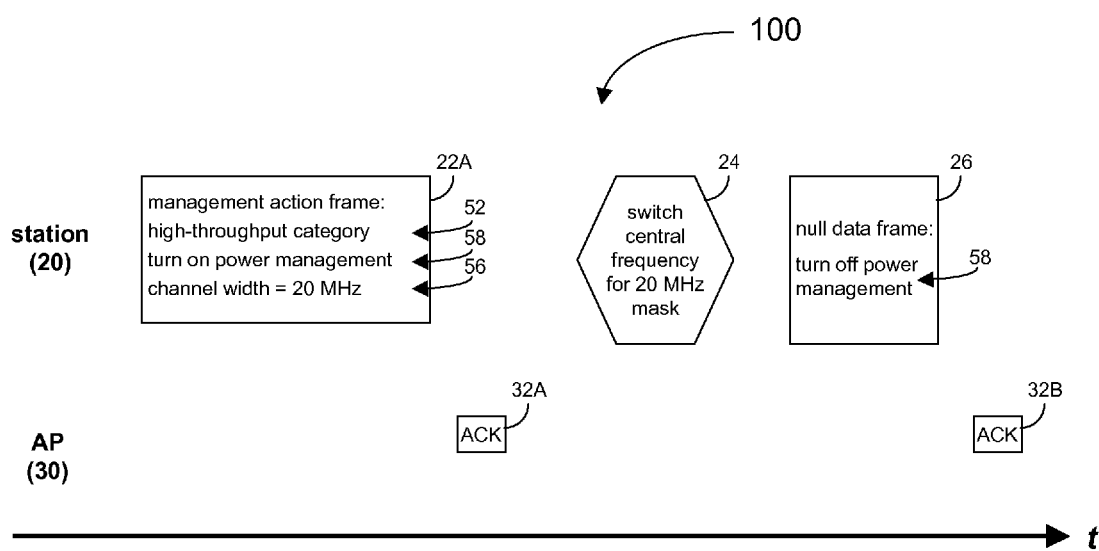
FIG. 1 is a schematic diagram of a communication method between station and access point in which the central frequency is changed while in power savings mode, according to some embodiments.

In accordance with the embodiments described herein, a method for modifying a central frequency of a channel without disruption of communication is disclosed. The communication takes place in a wireless LAN environment between a station and an access point (AP). The central frequency is changed following a switch from a 40 MHz channel width to a 20 MHz channel width for communication, and vice-versa.

In one implementation, the station communicates to the AP a desire to switch channel (width) modes. In parallel (e.g., in the same frame), the station communicates the power savings mode, after which the station changes the central frequency of the channel. The station is not actually in power management mode, but the AP believes the station is in power management mode, and so does not transmit frames to the station. Therefore, loss of data during the frequency change operation does not occur. After the central frequency change is made, the station notifies the AP that the station is in full power mode.

In a second implementation, the station communicates the desire to switch channel modes after receiving a beacon frame from the AP, then switches the central frequency of the channel during a subsequent beacon. In a third implementation, the station switches the central frequency a predetermined time period prior to the subsequent beacon. This implementation protects against frame transmissions that occur so close to the target beacon transmission time (TBTT) that the subsequent beacon transmission is delayed.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. The following detailed description is, therefore, not to be construed in a limiting sense, as the scope of the present invention is defined by the claims.

With reference to FIGS. 1-6, methods 100 and 200 are disclosed for performing central frequency modification without communication disruption, according to some embodiments. The methods 100 and 200 are useful for stations which are capable of communicating either in a 20 MHz channel or a 40 MHz channel. From time to time, as explained above, the station may desire to change from one channel width to another. In order to avoid noise and other interference from compromising communication with other stations or APs, the station prefers to change the central frequency when changing channel width modes. Further, by changing the central frequency after a channel width mode change, enables an appropriate mask to be used. However, changing the central frequency takes time, which may cause the station to miss a packet of data. The methods 100 and 200 are implementations to prevent or mitigate loss of data while the station is changing the central frequency.

Throughout this document, the terms "20 MHz channel width" and "20 MHz mode" are used interchangeably, and are intended to have the same meaning. Similarly, the phrases "40 MHz channel width" and "40 MHz mode" are to be interpreted as having the same meaning. A mode change may refer to a change from a 40 MHz channel width to a 20 MHz channel width, or vice-versa, unless otherwise indicated. The channel width pertains to a communication channel between a station and an access point, a station and a station, or between two access points.

FIG. 1 is a schematic diagram of a method 100 for performing central frequency modification without communication disruption, according to some embodiments. The method 100 describes actions between a station 20 and an AP 30. At the outset, the station 20 is operating in 40 MHz mode. The station 20, however, prefers to operate in a 20 MHz mode. Accordingly, the station transmits a management action frame 22A to the AP 30, and includes some parameters that notify the AP of its intention to change modes. In some embodiments, the management action frame includes parameters for the following characteristics of the station 20: 1) a high-throughput (HT) parameter 52, 2) a channel width indication parameter 56, and 3) a power management (save) mode parameter 58. The channel width indication parameter specifies that communication with the station 20 is to be conducted on a 20 MHz wide channel. The power management mode parameter 58 is enabled, indicating that the station 20 is to enter a power management mode. The management action frame 22A, includes many more fields than are indicated in FIG. 1, which are not pertinent here. (For more details about management action frames and other frames used in 802.11n communication, *An AT MAC Specification*, version V 1.24 is available online from the Enhanced Wireless Consortium (EWC), © 2005.)

Once the AP 30 receives the notification of switching to a 20 MHz channel width, the AP 30 thereafter transmits to the station 20 according to the 20 MHz mode. It is thus in the interest of the station 20 to change the central frequency as soon as possible after sending the notification to the AP 30.

Further, once the AP 30 receives the notification that the station 20 is entering power management mode, the AP 30 no longer sends frames to the station 20. The station 20 is not actually entering the power management mode but, from the perspective of the AP 30, is in the power management mode. Thus, the station 20 may be thought of as being in a "constructive power management mode" during this time period.

Before the station 20 may change the central frequency, the AP sends an acknowledgement (ACK) 32A of having received the management action frame. Once the ACK 32A is received, the station 20 is in constructive power management mode. In constructive power management mode, the station 20 will not receive communication (frames) from other stations or other APs. Thus, without risk of missing a frame, the station 20 may switch the central frequency to match the desired mode, in this case, changing to a central frequency for a 20 MHz channel. After the central frequency has been changed, the station 20 sends a null data frame 26, including the power management mode parameter 58, in a disabled state, to turn off the constructive power management mode. Once the station 20 receives an ACK 32B from the AP 30, the station 20 is no longer in constructive power management mode, and may again receive communication (frames) from the AP 30 and other devices in the wireless LAN environment. Although the above example describes a switch from 40 MHz mode to 20 MHz mode, the operations may similarly be applied to a switch from 20 MHz mode to 40 MHz mode.

Figure 2:
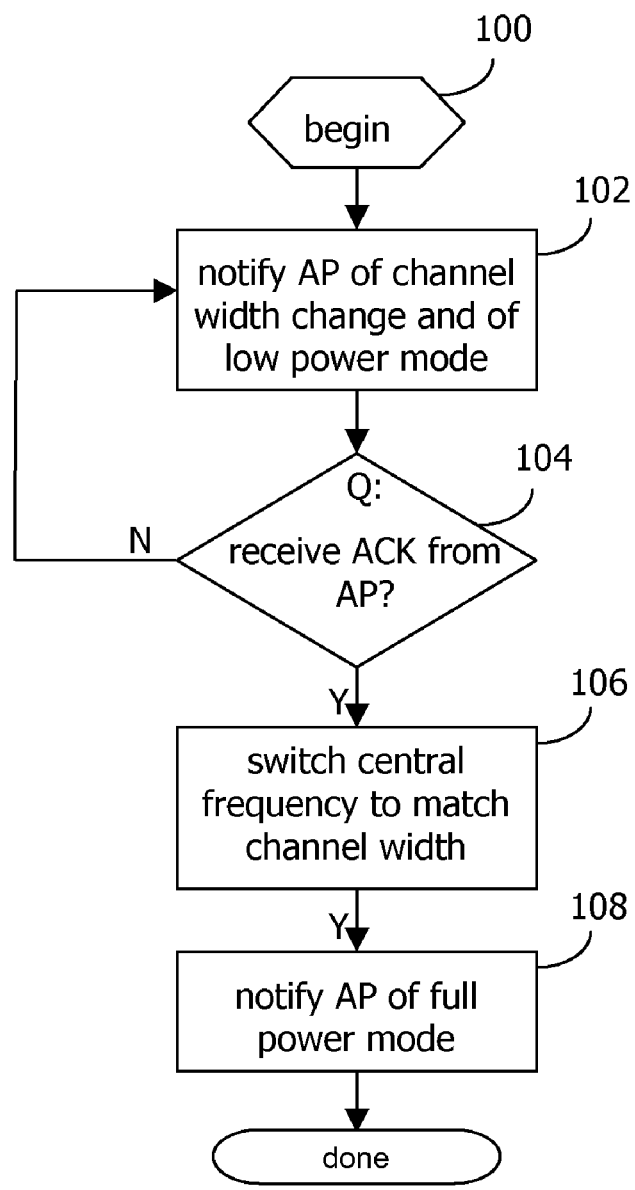
FIG. 2 is a flow diagram illustrating operation of the method of FIG. 1, according to some embodiments.

FIG. 2 is a flow diagram of the method 100 of FIG. 1, according to some embodiments. The station 20 notifies the AP 30 that it desires to change channel widths (40 MHz to 20 MHz or 20 MHz to 40 MHz) and notifies the AP 30 that it is entering power management (low power) mode (block 102). After receiving this notification, the AP 30 will thereafter communicate with the station 20 using the new channel width. The station 20 is also in the constructive power management mode, in which the AP 30 believes the station 20 to be in a low-power state. The station 20 then waits for an ACK from the AP (block 104). If no ACK is forthcoming, the station 20 resubmits the requests (block 102).

Once the ACK is received from the AP 30 (the "yes" prong of block 106), the station 20 is in constructive power management mode. Accordingly, the station 20 may switch the central frequency of the communications channel to match the change in channel width (block 106). Once completed, the station 20 disables the constructive power management mode (e.g., operates in a full-power mode) by sending a null data frame (with the power management mode parameter 58 turned off) to the AP 30 (block 110). Although not shown in FIG. 2, from the perspective of the AP 30, the station 20 is not restored to full-power mode until receiving the ACK from the AP 30, and may need to resend the request if needed.

The method 100 is an effective mechanism to change the central frequency following a channel width change. While the station is in constructive power management mode, the station 20 does not receive communication (frames) from other entities (stations or APs) on the wireless LAN. The protocol for switching to constructive power management mode, then back to full-power mode, is known, and may thus be exploited to modify the central frequency.

Figure 3:
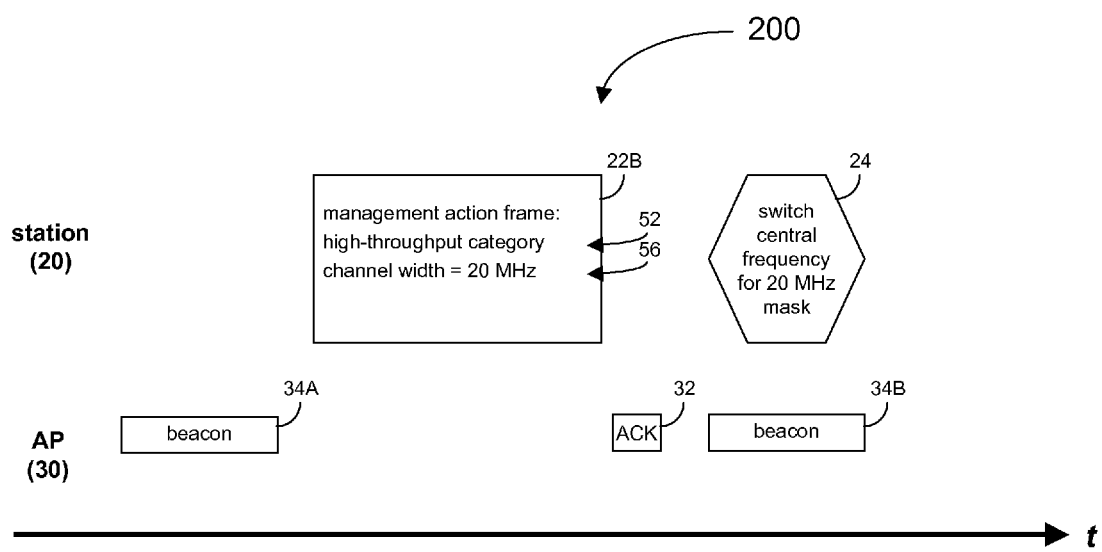
FIG. 3, is a schematic diagram of a method between station and access point in which the central frequency is changed during a beacon frame, according to some embodiments.

FIG. 3 is a schematic diagram of a second method 200 to change the central frequency, according to some embodiments. In this method 200, the central frequency is modified during a beacon interval, or beacon frame, rather than during a power management mode. A beacon frame is a periodic frame sent by the AP 30, which includes synchronization information. The beacon frame allows the station 20 and the AP 30 to remain in synchronization, so as to maintain communication therebetween. In FIG. 3, beacon frames 34A and 34B are shown (collectively, beacon frames 34).

In FIG. 3, the station 20 waits for the periodic beacon frame 34A. Once the station receives the beacon frame 34A, the station 20 recognizes the beacon type and sub-type. The type and sub-type identify the beacon frame 34A as having come from the AP 30 (and distinguishes the beacon frame from one coming from another AP). After the beacon frame 34A has been received, the station 20 sends the management action frame 22B, indicating a high-throughput (HT) category, notifying the AP 30 of channel width change, and specifying a desire for a 20 MHz channel width. The management action frame 22B is different from the management action frame 22A (FIG. 1) in that no change to the power management mode parameter is made. The management action frame 22B specifies 1) the high-throughput (HT) parameter 52, 2) the channel width change notification parameter 54, 3) the channel width indication parameter 56, set to 20 MHz in FIG. 3.

Once the station 20 receives an ACK 32 from the AP 30, indicating that the AP got the management action frame 22B, the station 20 waits for a subsequent beacon frame 34B (since the beacon frames are periodic). Upon receiving the beacon frame 34B, the station 20 switches the central frequency in accordance with the desired channel mode width of 20 MHz. Similarly, the above operations may be applied to a switch from 20 MHz mode to 40 MHz mode.

In contrast to the method 100 (FIGS. 1 and 2), in which no frames are missed by the station 20, while the central frequency is being changed by the station 20, the beacon frame 34B is lost using the method 200. However, since the beacon frame 34 is repeated periodically, any single beacon frame may be thought of as a redundant frame. After losing the beacon frame 34B (because of switching the central frequency), the station 20 is able to obtain a subsequent beacon frame (not shown), with the synchronization information therein.

Figure 4:
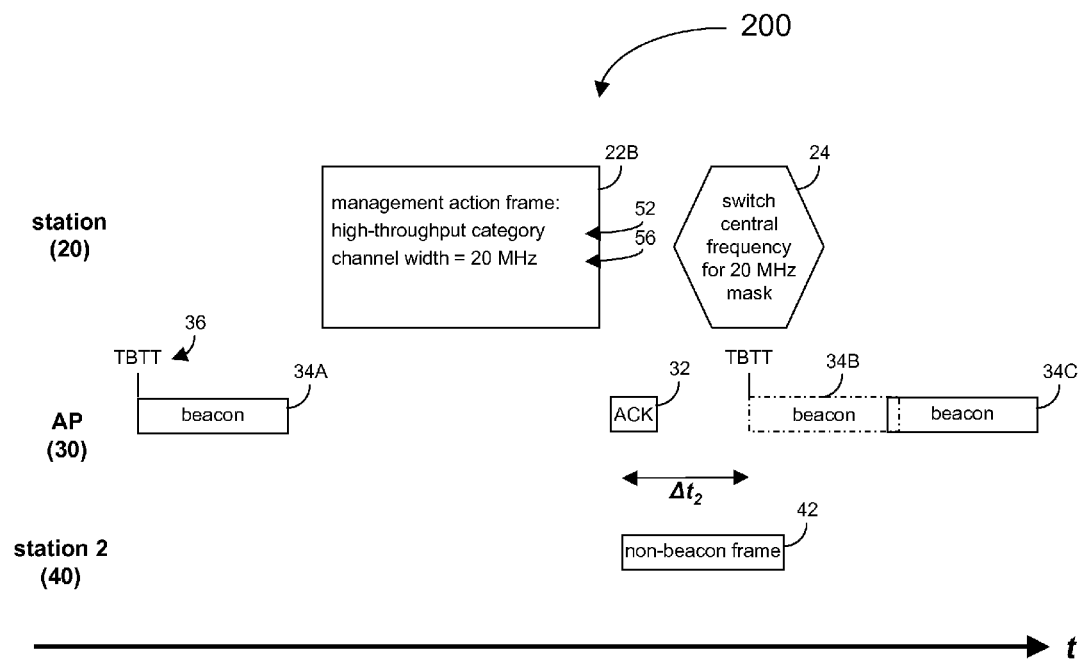
FIG. 4 is a schematic diagram illustrating a deficiency in the method of FIG. 3, according to some embodiments.

The schematic diagram of FIG. 4 illustrates a drawback of the method 200, according to some embodiments. An indicator, known as a target beacon transmission time (TBTT) 36, communicates to the station 20 when to expect the beacon from the AP 30. The TBTT 36 is shown at the beginning of the first beacon frame 34A, and may similarly indicate the start of all subsequent beacon frames. It is possible that an entity may transmit a frame such that the TBTT is wrong.

In FIG. 4, a second station 40 transmits a non-beacon frame 42 some minimum time before the TBTT 36 (indicating expected beacon transmission time). The non-beacon frame 42 causes the beacon frame 34C to actually occur later than is indicated by the TBTT, where beacon frame 34B is where the beacon frame would have occurred, absent the occurrence of the non-beacon frame 42. Where the non-beacon frame 42 from the second station 40 is intended for the station 20, the station 20 will not get the frame 42. This is because the station 20 is in the process of switching the central frequency 24. Thus, FIG. 4 indicates that the method 200 is not failsafe, as the non-beacon frame 42 is missed by the station 20.

Figure 5:
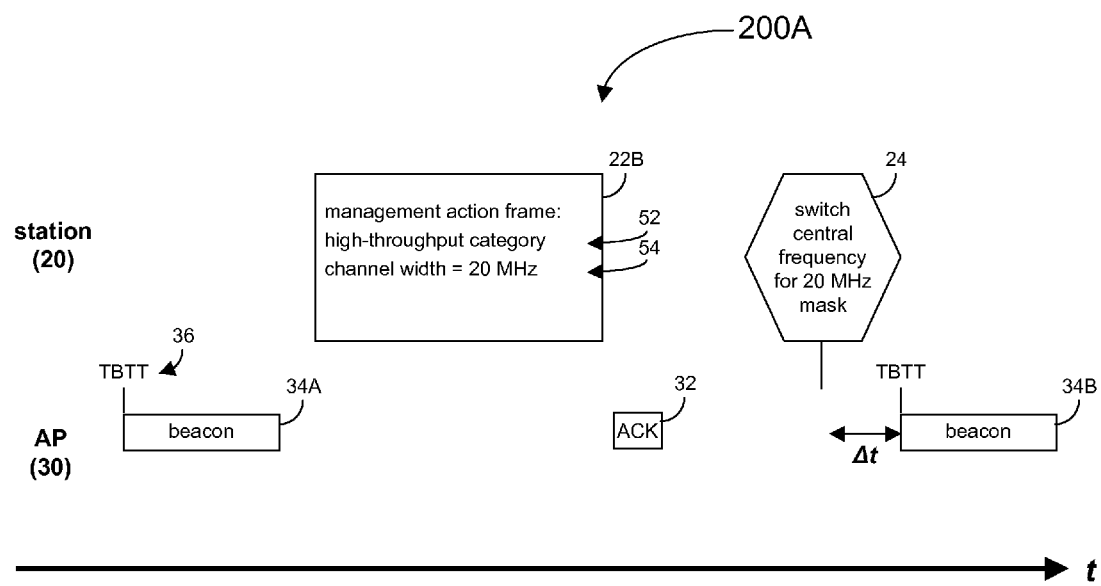
FIG. 5 is a schematic diagram of an improvement to the method of FIG. 3, according to some embodiments.

In FIG. 5, an improvement to the method 200, method 200A, is schematically depicted, according to some embodiments. In this embodiment, the station 20 does not wait for the TBTT 36 (indicating the beacon frame) to switch the central frequency, but calculates a time period, $\Delta t$, before the TBTT 36, to perform the central frequency switch. Stations generally do not transmit frames during a time period that is very close to the TBTT 36. In FIG. 4, the non-beacon frame 42 is transmitted during a time period, $\Delta t_2$, with $\Delta t_2 > \Delta t$.

If a non-beacon frame is to be transmitted, such as the non-beacon frame 42 from the station 40 (FIG. 4), such a transmission would be evident to the station 20 during the time frame TBTT-$\Delta t_2$. However, if no such non-beacon frame 42 is transmitted, the station 20 knows, at the time period TBTT-$\Delta t$, that no non-beacon frame 42 will be transmitted (since stations do not transmit frames very close to the TBTT 36). Thus, the station 20 may safely switch the central frequency during the time, TBTT-$\Delta t$. In some embodiments, the time period, $\Delta t$, is approximately equal to the time the station 20 takes to change the central frequency. Accordingly, the station 20 will complete the central frequency switching operation in the new time, TBTT-$\Delta t$, which is enough time to not lose the subsequent beacon frame 34B.

Figure 6:
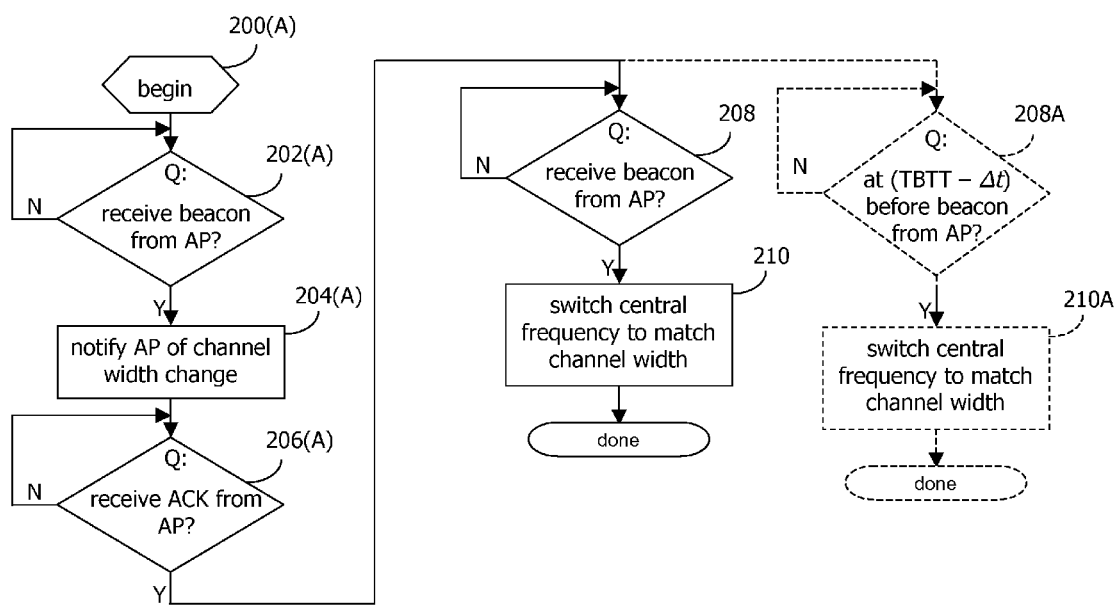
FIG. 6 is a flow diagram illustrating operation of the methods of FIGS. 3 and 5, according to some embodiments.

FIG. 6 is a flow diagram of the method 200 (and modified method 200A) for performing central frequency modification with minimal or no communication disruption, according to some embodiments. The methods 200 and 200A initially perform the same steps, then diverge at steps 208 (208A), as indicated. The method 100 (200A) receives a beacon frame 34A from the AP 30 (block 202(A)). Until a beacon frame is received, the method 200 (200A) does not commence. Once the beacon frame 34A is received from the AP 30, the station 20 notifies the AP 30 of the change in channel width (block 204(A)). Until the station 20 receives an ACK from the AP 30 (block 206(A)), no further action may be taken to modify the central frequency.

Once the ACK is received from the AP 30 (the "yes" prong of block 206(A)), all further communication from the AP 30 to the station 20 takes place using the newly specified channel width. Thus, the station 20 preferably updates the central frequency of the channel as soon as possible. At this point in the flow diagram, the operations between the method 200 and the method 200A diverge. First, the operations of the method 200 are described.

The station 20 waits for the subsequent beacon frame 34B, which is periodic and is expected at a predetermined time known to the station 20 (block 208). Upon receiving the beacon frame (the "yes" prong of block 208), the station 20 switches the central frequency to match the previously specified channel width, sent in the management action frame 22A (block 210). Using the method 200, at most, one beacon frame 34B is missed by the station 20, while the central frequency is switched.

Now, the operations of the method 200A are described. The station 20 waits for a time period, TBTT-$\Delta t$, to arrive (block 208A). At this point, it is safe to assume that no non-beacon frame 42 will arrive, since the time period, $\Delta t$, is too close to the time, TBTT. Therefore, the station 20 switches the central frequency to match the previously specified channel width, sent in the management action frame (block 210A). The time period, $\Delta t$, approximates the time needed for the station 20 to switch the central frequency. Thus, using the method 200A, no frames are lost while the central frequency is switched by the station 20.

The methods 100, 200, and 200A provide higher station and overall basic service set (BSS) throughput for wireless LANS having stations and APs that support switching between 20 MHz and 40 MHz channel widths, in some embodiments, as well as in 802.11 legacy BSS stations and APs having overlapping secondary channel of 802.11n BSS employing 20/40 channels. The methods 100, 200, and 200A improve fairness between overlapping legacy and high-throughput BSSs.

The methods 100, 200, and 200A give the station 20 enough time to switch the central frequency and minimize the number of frames lost during the switching time. The methods 100, 200, and 200A may increase the throughput performance in middle-input, middle-output (MIMO) overlapping bandwidth BSS and in congested high-density corporate small office/home office (SOHO) environments.

While the above has been described with respect to a limited number of embodiments, those skilled in the art will appreciate numerous modifications and variations therefrom. It is intended that the appended claims cover all such modifications and variations as fall within the true spirit and scope of the invention.

I claim:

1. A method, comprising:
    transmitting a management action frame to an access point by a station, the access point and the station communicating through a channel of a predetermined channel width, the management action frame comprising:
        an enabled power management mode parameter; and
        a channel width indication parameter, indicating a desired channel width that is different from the predetermined channel width;
    entering a constructive power management mode in which the access point believes the station is in a low power state and therefore does not send frames to the station after receiving the power management mode parameter;
    switching a central frequency of the communication channel by the station to a new central frequency while the access point believes the station is in a low power state, the central frequency to match the desired channel width; and
    leaving the constructive power management mode, wherein the station receives frames thereafter at the new central frequency and desired channel width.

2. The method of claim 1, further comprising:
    receiving an acknowledge from the access point after the management action frame is transmitted thereto;
    wherein subsequent communication from the access point to the station would occur according to the channel width indicated by the channel width indication parameter, except that no communication from the access point occurs because the access point believes the station is in a low power state.

3. The method of claim 2, wherein the central frequency is switched by the station immediately after the acknowledge from the access point is received by the station.

4. The method of claim 1, further comprising:
    disabling the constructive power management mode by the station.

5. The method of claim 4, disabling the constructive power management mode by the station further comprising:
    sending a null data frame to the access point, the null data frame comprising the disabled power management mode parameter.

6. The method of claim 4, disabling the constructive power management mode by the station further comprising:
    sending a frame to the access point, the frame comprising the disabled power management mode parameter.

* * * * *